(12) United States Patent
Rangan et al.

(10) Patent No.: US 9,475,263 B1
(45) Date of Patent: Oct. 25, 2016

(54) BREATHABLE CHEMICAL, BIOLOGICAL, RADIATION, AND/OR NUCLEAR PROTECTION FABRIC OR MATERIAL

(75) Inventors: Krishnaswamy Kasthuri Rangan, Fairfax, VA (US); Tirumalai Srinivas Sudarshan, Vienna, VA (US)

(73) Assignee: MATERIALS MODIFICATION, INC., Fairfax, VA (US)

( * ) Notice: Subject to any disclaimer, the term of this patent is extended or adjusted under 35 U.S.C. 154(b) by 0 days.

(21) Appl. No.: 12/926,201

(22) Filed: Nov. 2, 2010

Related U.S. Application Data

(60) Provisional application No. 61/257,476, filed on Nov. 3, 2009, provisional application No. 61/257,477, filed on Nov. 3, 2009.

(51) Int. Cl.
| | |
|---|---|
| *B32B 27/12* | (2006.01) |
| *B32B 3/26* | (2006.01) |
| *B32B 5/16* | (2006.01) |
| *G21F 7/00* | (2006.01) |
| *G21F 3/02* | (2006.01) |
| *B32B 27/00* | (2006.01) |
| *G21F 1/00* | (2006.01) |
| *G21F 3/00* | (2006.01) |

(52) U.S. Cl.
CPC ............... *B32B 27/00* (2013.01); *G21F 1/00* (2013.01); *G21F 3/00* (2013.01); *G21F 3/02* (2013.01)

(58) Field of Classification Search
CPC .......... H01M 6/18; H01M 6/14; H01M 8/10; C08J 5/22
USPC ........ 428/320.2–328, 304.4–319.7; 442/122; 250/516.1, 515.1, 519.1
See application file for complete search history.

(56) References Cited

U.S. PATENT DOCUMENTS

| | | | |
|---|---|---|---|
| 5,260,360 A | 11/1993 | Mrozinski et al. | |
| 6,635,384 B2* | 10/2003 | Bahar et al. | 429/188 |
| 6,841,791 B2* | 1/2005 | DeMeo et al. | 250/515.1 |
| 7,121,077 B2* | 10/2006 | Andrews et al. | 57/210 |
| 2002/0071944 A1* | 6/2002 | Gardner et al. | 428/198 |
| 2005/0211930 A1* | 9/2005 | DeMeo | G01V 5/0008 250/516.1 |
| 2007/0062884 A1* | 3/2007 | Sun et al. | 210/764 |
| 2007/0196638 A1* | 8/2007 | Wei et al. | 428/304.4 |
| 2007/0259979 A1 | 11/2007 | Lee | |
| 2009/0130161 A1* | 5/2009 | Sarangapani | 424/409 |
| 2009/0297911 A1* | 12/2009 | Moore et al. | 429/33 |
| 2010/0160466 A1* | 6/2010 | Elabd et al. | 521/27 |
| 2011/0104474 A1* | 5/2011 | Liu et al. | 428/322.7 |
| 2012/0135658 A1* | 5/2012 | Stone et al. | 442/286 |

OTHER PUBLICATIONS

H. Chen, G.R. Palmese, Y.A. Elabd. Membranes with Oriented Polyelectrolyte Nanodomains, Chem. Mater., 18, 4875-4881 (2006).

(Continued)

*Primary Examiner* — Jennifer Chriss
*Assistant Examiner* — Camie Thompson
(74) *Attorney, Agent, or Firm* — Jyoti C. Iyer

(57) ABSTRACT

A protective fabric or material includes a base material and at least one inorganic filler selected from the group consisting of a chemical decontamination agent, a biological decontamination agent, an electromagnetic radiation shielding agent, an antimicrobial agent, a self-decontaminating agent, a decontamination catalyst, a carbon dioxide absorbing agent, and a combination thereof.

15 Claims, 8 Drawing Sheets

(56) References Cited

OTHER PUBLICATIONS

H. Chen, A.M. Rahmathullah, G.R. Palmese, Y.A. Elabd. Polymer-Polymer Nanocomposite Membranes as Breathable Barriers with Electro-Sensitive Permeability; In Nanoscience and Nanotechnology for Chemical and Biological Defense. Nagarajan, R. Ed.; ACS Symposium Series; Oxford University Press. (2008) (18 pages).
K. Mitshuishi, S. Komada, H. Kawasaki. Mechanical properties of oriented porous polypropylene filled with modified calcium carbonate, J. Mater. Sci. Lett. 6, pp. 434-436 (1987).
D.L. Green, L. McAmish, A.V. McCormick. Three-dimensional pore connectivity in bi-axially stretched microporous composite membranes, Journal of Membrane Science, 279, 100-110 (2006).
L.C. Wadsworth, H.C. Allen. Development of highly breathable and effective blood/viral barrier laminates of microporous membranes, stable fibers and nonwovens, in: INDA-TEC 98: Book of Papers, INDA, Association of the Nonwoven Fabrics Industry, Cary, NC, 1998, vol. 28, pp. 12-28.
H.L. Schreuder-Gibson, Q. Truong, J.E.Walker, J.R.Owens, J.D. Wander, W.E. Jones Jr. Chemical and Biological Protection and Detection in Fabrics for Protective Clothing, MRS Bulletin, 574-578 (2003).
G.W. Wagner, O.B. Koper, E. Lucas, S. Decker, K.J. Klabunde. Reactions of VX, GD, HD with Nanosize CaO: Autocatalytic Dehydrohalogenation of HD. J. Phys. Chem. B, 104, 5118-5123 (2000).
K.J. Klabunde, J. Stark, O. Koper,C. Mohs, D.G. Park, S. Decker, Y. Jiang, I. Lagadic, D. Zhang. Nanocrystals as Stoichiometric Reagents with Unique Surface Chemistry. J. Phys. Chem., 100, 12142-12153 (1996).
G.W. Wagner, L.R. Procell, R.J. O' Connor, S. Munavalli, C.L. Carnes, P.N. Kapoor, K.J. Klabunde. Reactions of VX, GB, GD, and HD with Nanosize $Al_2O_3$. Formation of Aluminophosphonates. J. Am. Chem. Soc. 123, 1636-1644 (2001).
R.D. Gall, C.L. Hill, J.E. Walker. Selective Oxidation of Thioether Mustard (HD) Analogs by tert-Butylhydroperoxide Catalyzed by $HPV_2Mo_{10}O_{40}$ Supported on Porous Carbon Materials. J.Catalysis, 159, 473-478 (1996).
P.J. Domaille. 1- and 2-Dimensional tungsten-183 and vanadium-51 NMR characterization of isopolymetlates and heteropolymetalates, J. Am. Chem. Soc. 106, 7677-7687 (1984).
M.R. Badrossamay, G. Sun. Acyclic halamine polypropylene polymer: Effect of monomer structure on grafting efficiency, stability and biocidal activities. Reactive & Functional Polymers 68 1636-1645 (2008).
ASTM E 96-95. Standard Test Methods for Vapor Transmission of Materials. Annu. Book of ATM Stand. (2002) (11 pages).
Handbook of Chemistry and Physics; 66th Edition; CRC Press Inc.: Florida, 1985.
The Merck Index. An Encyclopedia of Chemicals, Drugs, and Biologicals, 13th Ed; Merck and Co., Inc.: Whitehouse Station, NJ, (2001).
W. Mayer, U. Mohr, M. Schrierer. High-tech Textiles: Contribution made by Finishing, in an Example of Functional Sports and Leisurewear, International Textile Bulletin , 35, 16-32, (1989).
R. Roth. Current Status of Research, Development, and Testing of Fabrics for Chemical/Biological Warfare. Presentation by R. Roth to the Outlook '82 IFAI 23rd Conference, New York, May 19, 1982.
Standard Test Method for Thermal and Evaporative Resistance of Clothing Materials Using a Sweating Hot Plate, ASTM 1868-2, ASTM International, West Conshohocken, PA (8 pages).
E.H. Harrison, S.A. Procell, M.J. Gooden, A.D. Seiple. Test Results of Air-permeable Saratoga™ Hammer Suit to Challenge by Chemical Warfare Agents, ECBC Report (Mar. 2004) (51 pages).
Standard Specification for Coated Fabrics-Waterproofness, ASTM D 3393-91 (2005) ASTM International, West Conshohocken, PA. (2 pages).
Standard Guide for Abrasion Resistance of Textile Fabrics (Rotary Platform, Double-Head Method) ASTM D 3884 (4 pages) (Abstract).
Y. Lee, S. Chadha, A.Riecker, T. Mendum, J. Puglia. Dynamic nanocomposite self-deactivating fabrics for the individual and collective protection. Foster-Miller, Inc. Watham, MA (9 pages).
Q. Truong and D. Rivin. Evaluation of CHEMPAK Light™ Membrane for Chemical/Biological Protective Clothing, NATICK/TR-96/023L (U.S. Army Natick Research, Development, and Engineering Center, Natick, MA (1996).
J. Lin, C. Winkelmann, S.D. Worley, J. Kin, C.-I. Wei,k U. Cho, R.M. Broughton, J.I. Santiago, and J.F. Williams. Antimicrobial Treatment of Nylon. J. Appl. Polym. Sci. vol. 81 p. 943-947 (2001).
G. Sun and X. Xu. Textile Chemist and Colorist 30, 26 (1998).
G. Sun and X. Xu. Halamine Chemistry and its Applications in Medical Textiles. Textile Chemist and Colorist 31, 31 (1999) (22 pages).
J. Lin, C. Winkelmann, S.D. Worley, J. Kin, C.-I. Weik, U. Cho, R.M. Broughton, J.I. Santiago, and J.F. Williams. Biocidal Polyster. J. Appl. Polym. Sci. 85, pp. 177-182 (2002).
S.D. Worley, F. Li, R. Wu, J. Kim, C.K. Wei, J.F. Williams, J.R. Owens, J. Wander, A.M. Bargmeyer, and M.E. Shirtlif. A Novel $N$-halamine monomer for preparing biocidal polyurethane coatings. Surf. Coat. Int., Part B, Coat. Trans. (2002) 8 pages.
H.L. Schreuder, P. Gibson, K. Senecal, M. Sennett, J. Walker, W. Yeomans, D. Ziegler, and P.T. Tsai. Protective textile materials based on electrospun nanafibers. J. Adv. Mater. 34, 44-45 (2002). (1 page) Abstract.
P.S. Hammond, J.S. Forester, C.N. Lieske, and H.D. Durst. Hydrolysis of Toxic Organophosphorus Compounds by $o$-lodosobenzoic Acid and Its Derivatives. J. Am. Chem. Soc. 111, 7860-7866 (1989).
Johnson RP, Hill CL. Polyoxometalate oxidation of chemical warfare agent simulants in fluorinated media, J. Applied Toxicology, 19, S71-S75, Supplement: Suppl. 1 (1999).
U.S. Markets for (CBN) Industrial Protective Apparel, F586-39, Frost & Sullivan (2006) (10 pages).
P.A. Karam. Radiological Terrorism. Human and Ecological Risk Assessment, 11: 501-523 (2005).
H. Vogel. Rays as weapons, European Journal of Radiology, 63, 167-177 (2007).
T.L. McGehee, V.F. Medina, R.M. Martino, A.J. Bednar, C.A. Weiss, Jr. D. Abraham. Fixation of Heavy Contaminants of a Dirty Bomb Attack: Studies with Uranium and Metal Simulants, Environmental Progress, vol. 26, No. 1, 94-103 (2007).
A. Shea. Radiological Dispersal Devices: Select Issues in Consequence Management, CRS Report for Congress. Updated Dec. 7, 2004. http://www.fas.org/spp/starwars/crs/RS21766.pdf. (6 pages).
H.L. Schreuder-Gibson, P. Gibson, K. Senecal, M. Sennett, J. Walker, W. Yeomans. Protective extile materials based on electrospun nanofibers. J. Adv. Mater. vol. 34, No. 3, 44-55(2002). (1 page) Abstract.
C.L. Shao, H.Y. Kim, J. Gong, D.R. Lee. A novel method for making silica nanofibers by using electrospun fibers of polyvinylalcohol/silica composite as precursor. Nanotechnology, 13, 635-637 (2002).
S. Ramakrishna, K. Fujihara, W. Teo, T. Lim, Z. Ma. An introduction to electrospinning and nanofibers; World Scientific: Singapore, (2005).
Standard Guide for Abrasion Resistance of Textile Fabrics (Rotary Platform, Double-Head Method) ASTM D 3884 (4 pages) Accessed Jul. 26, 2012.
P. J. Lamperti, and M. O'Brien. NIST Measurement Services: Calibration of X—Ray and Gamma—Ray Measuring Instruments, Natl. Inst. Stand. Technol. Spec. Publ. 250-58 (Apr. 2001).
K. Singh, H. Singh, V. Sharma, R. Nathuram, A. Khanna, R. Kumar, S. S. Bhatti, H. S. Sahota. Gamma-ray attenuation coeffcients in bismuth borate glasses, Nuclear Instruments and Methods in Physics Research B, 194, 1-6, (2002).
S. Xu, M. Bourham, A. Rabiei, A novel ultra-light structure for radiation shielding. Materials and Design, 31, 2140-2146 (2010).
K. Autumn. Properties, Principles, and Parameters of the Gecko Adhesive System, pp. 225-256, Bioadhesives (Ed. AM. Smith and JA. Callow) Springer-Verlag, Heidelberg 2006 (39 pages).

(56) References Cited

OTHER PUBLICATIONS

M. Sitti and R.S. Fearing. Synthetic gecko foot-hair micro/nanostructures as dry adhesives. J. Adhesion Sci. Tech., 17 [8], 1055-1073, (2003).

A.K. Geim, S.V. Dubonos, I.V. Grigorieva, K.S. Novoselov, A.A. Zhukov and S. Yu. Shapovale. Microfabricated adhesive mimicking gecko foot-hair. Nature Materials, 2 [7], 461-463, (2003).

E. Kim, Y. Xia, and G. M. Whitesides. Polymer Microstructures Formed by Moulding in Capillaries, Nature 376, 581-584 (1995).

S. Y. Chou, P. R. Krauss, and P. J. Renstrom. Imprint of Sub-25 nm Vias and Trenches in Polymers, Appl. Phys. Lett. 67 (21), 3114-3120, 1995.

Kumar, H. A. Biebuyck, and G. M. Whitesides. Patterning SAMs: Applications in Materials Science, Langmuir 10, 1498-1511, 1994.

T.S. Kustandi, V. D. Samper, W.S. Ng, A.S. Chong, H. Gao. Fabrication of a gecko-like hierarchical fibril array using a bonded porous alumina template, J. Micromech. Microeng. 17 (2007) N75-N81.

Morin and A. Dufresne, Nanocomposites of Chitin Whiskers from Riftia Tubes and Poly (cprolactone). Macromolecules, 35, 2190-2199. 2002.

K. Fleming, D. G. Gray and S. Matthews. Cellulose Crystallites. Chem. Eur. J., 7, No. 9, 1831-1835, 2001.

Noorani, Sweda., Cellulose/ Polysulfone nanocomposites, in Department of Chemical Engineering and Wood Science . 2006, Oregon State University: Corvallis, OR (81 pages).

Gomez-Bujedo;, S., E.F. and M. R.Vignon. Preparation of Cellouronic Acids and Partially Acetylated Cellouronic Acids by TEMPO/NaClO Oxidation of Water-Soluble Cellulose Acetate. Biomacromolecules, 2004. 5: 565-571.

C. Menon, M. Murphy, M. Sitti. Gecko Inspired Surface Climbing Robots. IEEE International Conference on Robotics and Biomimetics (ROBIO), Shenyang, China, Aug. 2004, pp. 431-436.

K. Autumn, A. Dittmore, D. Santos, M. Spenko and M. Cutkosky. Frictional Adhesion: A New Angle on Gecko Attachment. The Journal of Experimental Biology 209, 3569-3579; (2006).

Jun Liu, Guozhong Cao, Xiaodong Zhou, Zhenguo Yang, Gordon L. Graff, Donghai Wang, Larry R. Pederson, Dan Dubois, Ji-Guang Zhang. Oriented Nanostructures for Energy Conversion and Storage, Chem. Sus. Chem., 1:676-697 (2008).

J. Minnich, M. S. Dresselhaus, Z. F. Ren and G. Chen. Bulk nanostructured thermoelectric materials: current research and future prospects, Energy Environ. Sci., 2, 466-479 (2009).

Standard Test Method for Flame Resistance of Textiles (Vertical Test), ASTM D6413-08.

\* cited by examiner

BREATHABLE CHEMICAL, BIOLOGICAL, RADIATION, AND/OR NUCLEAR PROTECTION FABRIC OR MATERIAL

CROSS-REFERENCE TO RELATED APPLICATIONS

The present application claims the priority benefit of prior U.S. Provisional Application Ser. No. 61/257,476, filed Nov. 3, 2009, and U.S. Provisional Application Ser. No. 61/257,477, filed Nov. 3, 2009, which are hereby incorporated herein in their entirety by reference.

STATEMENT REGARDING FEDERALLY SPONSORED RESEARCH OR DEVELOPMENT

Part of the present invention was made with government support under Contract No. W91CRB-10-C-0152 and the government has certain rights in the invention.

FIELD AND BACKGROUND OF THE INVENTION

This present invention is generally directed to chemical, biological, radiation, and/or nuclear protection (CBRN) material, and more particularly to a fabric, composite, material and/or article that is impervious to chemical and/or biological agent, and/or protects against electromagnetic radiation, and/or is breathable, and fabrication thereof.

Chemical and biological warfare agents (CBWA's) are destructive weapons that can terrorize, incapacitate, harm, or kill. CBWA's represent a real and growing threat to the military personnel, as well as civilians, livestock and other animals, and fauna and flora. In light of the continued threat of attacks by terrorists and other enemies, there is a growing need to protect both the military personnel and civilians, and other life from the release of chemical, biological and/or radiological agents (hereinafter referred to as "harmful agents").

The proliferation of nuclear weapons also has increased the possibility of their availability to terrorist organizations. This poses a serious threat to both military and civilian populations. Radiation released from these weapons can have significant impact on human/living tissue and cells. The desire of most terrorist organizations is to leave a everlasting fear in the minds of people. Radioactive-dispersal-devices (RDD), or "dirty-bomb," use conventional explosives to distribute radioactive particles. Dirty bombs can be prepared from a wide range of radioactive materials. High-energy radioactive isotopes, such as cobalt-60 and cesium-137, are of major concern because they emit penetrating gamma radiation. These radioactive elements can be acquired from various civilian locations that have minimal security, such as hospitals and dentist offices, and transported to nuclear plants that are in unfriendly or politically unstable countries.

An RDD attack could result in high casualties, if the explosion occurs in a battlefield, office building, indoor stadium, airport, train station, or another crowded or populated area. The emotional upheaval of the public and the economic loss this could create, would be significant because of the time involved to remediate the area following such an attack and to assure safety and normalcy.

The military, federal, state and local agencies are thus constantly working to strengthen plans for responding to the possibility of such a terrorist attack involving the use of nuclear agents. A priority must, therefore, be placed at protecting at least the military and civilian personnel from this deadly radiation so as to limit the effects of the radiation source and perform decontamination operations.

ASPECTS OF THE INVENTION

The present disclosure is directed to various aspects of the present invention.

One aspect of the present invention includes a fabric or material for civilian, military, and/or commercial use in protecting against CBRN agents/threats.

Another aspect of the present invention includes a breathable fabric or material for civilian, military, and/or commercial use in protecting against CBRN agents/threats.

Another aspect of the present invention includes a fabric or material for use in protecting against CBRN agents/threats.

Another aspect of the present invention includes a fabric or material which can be used to make articles, apparel, and/or other gear for protection against CBRN agents/threats.

Another aspect of the present invention includes an inner liner fabric for use in making a chemical and/or biological agent protective apparel, garment, or article.

Another aspect of the present invention includes a breathable fabric or material with a water vapor transport rate (WVTR) greater than 100 $g/m^2/day$.

Another aspect of the present invention includes a fabric or material which is capable of self-decontaminating chemical and/or biological agents.

Another aspect of the present invention includes inorganic oxide, polymer gel, and polymer composite fabric or material. A variety of inorganic materials can be used as fillers. Preferred inorganic compounds are titanium oxide, zinc oxide, magnesium oxide, magnesium hydroxide, silver compounds, calcium oxide, calcium hydroxide and aluminum oxide for chemical and biological agent decontamination, and heavy element such as tin, antimony, tungsten, bismuth, uranium containing compounds for electromagnetic radiation shielding.

Another aspect of the present invention includes detection of exposure to chemical and/or biological agents.

Another aspect of the present invention includes decomposition of chemical agents when contacted with a fabric, material, or polymer composite of the present invention.

Another aspect of the present invention includes decomposition of biological agents when contacted with a fabric, material, or polymer composite of the present invention.

Another aspect of the present invention includes a polymer composite including one or more chemical decontaminating catalytic agents including, but not limited to, polyoxometalates, nanometal oxides, enzymes, organic molecules such as iodozobenzoic acid.

Another aspect of the present invention includes a radiation shielding breathable fabric or material.

Another aspect of the present invention includes a carbon dioxide and/or other toxic gas absorbing/trappic fabric or material.

Another aspect of the present invention includes a nanostructure that mimics a structure occurring in nature including, but not limited to, lotus leaf, insects and lizards.

Another aspect of the present invention includes a nanopatterned surface for dry adhesive application.

Another aspect of the present invention includes a nano- and micropatterned surface prepared in a hierarchical fashion.

Another aspect of the present invention includes a superhydrophobic surface.

Another aspect of the present invention includes a superhydrophilic surface.

Another aspect of the present invention includes nano-sized metals, metal oxides, chalcogenides with high-aspect ratio, such as nanotubes, nano-scrolls, and nano-ribbons, etc.

Another aspect of the present invention includes inorganic-polymer composites and metal-polymer composites.

Another aspect of the present invention includes a protective fabric, including a base material, and at least one inorganic agent selected from the group consisting of lead oxide, iron oxide, chrome oxide, titania, aluminia, titanium oxide, zinc oxide, magnesium oxide, magnesium hydroxide, silver, silver compound, calcium oxide, calcium hydroxide, aluminum oxide, tin, tin compound, antimony, antimony compound, tungsten, tungsten compound, boron, boron compound, silicon, silicon compound, bismuth, bismuth compound, lead, lead compound, platinum, platinum compound, gold, gold compound, copper, copper compound, uranium, uranium compound, and a combination thereof.

Another aspect of the present invention includes a breathable protective material, including a porous base material, and at least one inorganic filler selected from the group consisting of a chemical decontamination agent, a biological decontamination agent, an electromagnetic radiation shielding agent, an antimicrobial agent, a self-decontaminating agent, a decontamination catalyst, a carbon dioxide absorbing agent, and a combination thereof.

Another aspect of the present invention includes a breathable material for protection against a chemical or biological warfare agent, including a base material having pores impregnated with an inorganic filler. The filler includes a chemical decontamination agent, a biological decontamination agent, or a combination thereof. The chemical or biological decontamination agent includes at least one member selected from the group consisting of titanium oxide, zinc oxide, magnesium oxide, magnesium hydroxide, silver, silver compound, calcium oxide, calcium hydroxide, aluminum oxide, and a combination thereof.

Another aspect of the present invention includes a breathable material for protection against electromagnetic radiation, including a base material having pores impregnated with an inorganic filler. The filler includes at least one radiation shielding agent selected from the group consisting of tungsten, tungsten-salt, boron, silicon, a heavy element, a heavy element compound, metal, metal oxide, and a combination thereof.

BRIEF DESCRIPTION OF THE DRAWINGS

One of the above and other aspects, novel features and advantages of the present invention will become apparent from the following detailed description of the non-limiting preferred embodiment(s) of invention, illustrated in the accompanying drawings, wherein.

DETAILED DESCRIPTION OF THE PREFERRED EMBODIMENT(S) OF THE INVENTION

The present invention is directed to the preparation of novel polymer composite fabrics, materials, and membranes that include one or more inorganic chemicals, which function as chemical or biological decontamination agents/catalysts, antimicrobial agents, and/or electromagnetic radiation shielding fillers. The term 'fabric' is used herein in a broader sense and includes, but not limited to, dense polymer sheets, porous polymer membranes, porous polymer sheets, inorganic membranes, and inorganic and organic fabrics.

Figure 1:
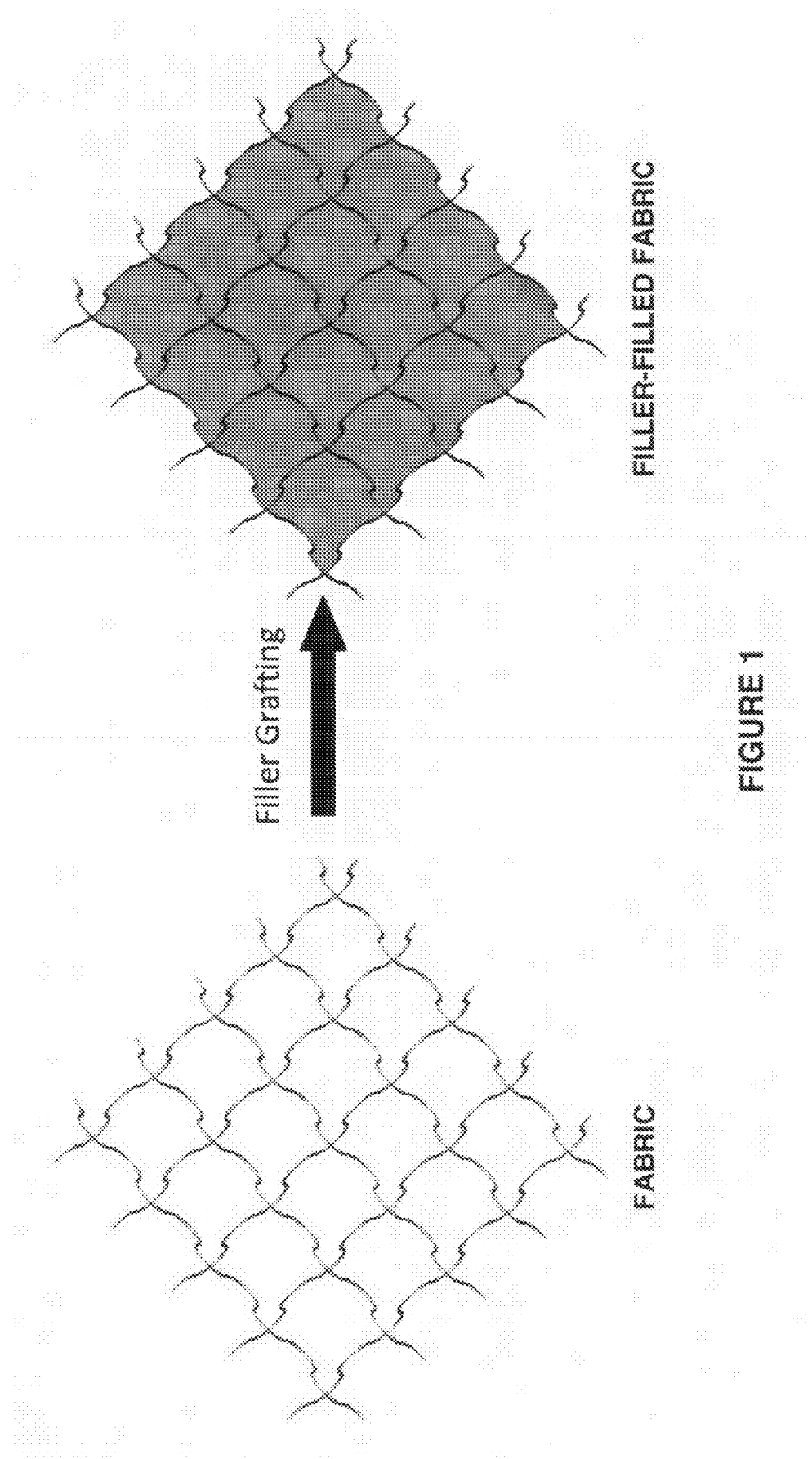
FIG. 1 is a schematic illustration of breathable CBRN shielding fabric technology.

A preferred embodiment of the present invention includes two parts, namely, (1) base fabric and (2) filler material. As schematically illustrated in FIG. 1, filling the pores or voids of a fabric with a filler results in a new class of fabric composites, where the filler enhances or regulates properties of the fabric, and provides mechanical stability and durability thereto. These composite fabrics can be tailored by the type of filler, pore size, and porosity of the fabric to provide CBRN protection properties.

A. Base Fabric

The base fabric can be any porous fabric, membrane or film including, but not limited to, track-etched polymeric membranes, microporous membranes, polymer sheets, porous polymer sheets, inorganic membranes, and inorganic and organic fabrics. The track-etched membrane can be of any polymer including, but not limited to, polycarbonate (PCTE), polyester (PETE), and polyimide (PITE). Fabric material can be selected from various conventional textile fabrics including, but not limited to, polyester, nylon, aramid, and cotton. The base fabric could be woven or non-woven.

Inorganic material impregnated fabric can be further filled with a variety of fillers, such as polymer gels mixed with inorganic chemicals, to achieve enhanced chemical and/or biological agent decontamination, protection against radiological particles and electromagnetic radiation shielding.

Track-Etched Polymer Membranes

Track-etched polymer membranes that have straight cylindrical pores which are oriented normal to the plane of the membrane, provide a promising platform in designing membranes with nano-domains with high aspect ratios oriented in a desired direction. The pore diameter can preferably range from about 5 nm to about 5 micron. Filling the pores of a track-etched membrane with fillers results in a new class of fabric composites, where the filler can enhance or regulate various properties, such as CBRN protection and the track-etched membrane can provide mechanical stability and durability. Compared to dense membranes, these composite membranes can be tailored by the type of filler, pore size, and porosity of the membrane, to provide tunable transport properties.

Microporous Polymer Membranes

Microporous polymer membranes can also be used as a breathable base fabric, and is a low-cost alternative to track-etched membranes. Polymer membranes with interconnected networks of micropores are fabricated by melting and stretching of inorganic particles compounded-polyolefins. These type of membranes exclude liquid water, but permit the passage of water vapor.

According to an embodiment of the present invention, base fabrics with about 10 nm to about 5 micron pore size, are filled with polyelectrolyte gel/titania nanotubes composite gel. Such fabrics also exhibit higher selectivity for water over organic chemicals. Microporous membranes with pore sizes of the same order (1000 nm) can also be filled with various fillers and offer higher selectivity for water over organics.

Electrospun Base Fabrics

Electro-spinning is a process for manufacturing nanofiber fabrics. Nanofiber fabrics possess an ultra-high surface area, high porosity, but very small pore size. These characteristics provide efficient trapping and good resistance to the penetration of harmful particles, while providing minimal resistance to water-vapor diffusion. In the present invention, inorganic particle filled electrospun-nanofiber fabrics can be used as a base fabric. While the inorganic filler-containing fiber material provides CBRN protection properties, the staggered-nanopores provide diffusion channels for moisture and provide breathability. The nanopores can be filled with various fillers.

The electrospinning process for making inorganic fibers includes the following steps:
  (1) preparation of a sol with suitable inorganic precursor and polymer content, and the right rheology for electrospinning;
  (2) spinning of the solution to obtain fibers of polymer/inorganic composite; and
  (3) pyrolysis of the composite fibers to obtain an inorganic nanofiber fabric.

It is important to control the above three stages in order to obtain a high-quality fabric with high mechanical strength and breathability.

B. Fillers

The host or base fabric provides a mechanically strong, durable, flexible barrier, while the filler component, preferably an inorganic filler, within the pores of the fabric, provides high water-vapor permeability (breathability), retards or prevents organic-molecule diffusion (chemical and biological agent barrier) and is capable of decontaminating chemical and/or biological agents. One ore more selective inorganic fillers in the pores can also act as electromagenetic radiation shielding materials. The inorganic filler preferably absorbs electromagnetic waves of frequencies in the range of microwaves to gamma rays, including X-rays.

Inorganic fillers, combined with a hydrophilic polymer gel, can be used as a pore filler for chemical and/or biological agent protection, and electromagnetic radiation shielding. Examples of inorganic fillers include, but not limited to, titanium dioxide, zinc oxide magnesium oxide, magnesium hydroxide, silver compounds, calcium oxide, heavy elements such as tungsten, tin, bismuth, and compounds of heavy elements.

Inorganic fillers can be nanoparticles, microparticles or particles with high aspect ratio, such as nanowires, nanotubes, nanoscrolls, and nanoflakes. The inorganic particles can also be crystalline or amorphous glassy materials.

The filler material can have any form including gels, particulates, powders or liquids. Inorganic particulates can be mixed with polymer gels and used as fillers.

Fillers for Enhanced Breathability (Improved Water or Water Vapor Transport Rate) and Chemical and Biological Agent Selectivity In order to increase the breathability and WVTR through the fabric, a hydrophilic material can be used as a filler. For example, any hydrophilic inorganic compound can be used as a filler to increase the WVTR of the fabric. As an example, magnesium hydroxide can be infiltrated into the pores of the fabric to increase the WVTR.

For the purpose of achieving effective chemical and biological defense, preferred inorganic materials include those which provide sufficiently high water transport (breathability) to reduce heat fatigue, and sufficiently low DMMP transport to reduce personnel risk from harmful agents. The ratio of effective permeability of water to CBWA is defined as selectivity, which is represented by the following formula:

$$\text{Selectivity} = P_{\text{eff}}(\text{Water})/P_{\text{eff}}(\text{CBWA})$$

A preferred material for a breathable protective clothing would have a very high water-transport rate and a very low agent-transport rate to give a high selectivity.

In accordance with an embodiment of the present invention, the addition of inorganic particulates, as fillers, increases the selectivity of the inventive fabrics for water, over chemical and/or biological agents.

Self-Decontaminating Fillers

In addition to contacting the skin of a user, CBWA's can also attach onto, for example, clothing or gloves in high concentrations and cause extensive contamination. The surface-attached toxic agent, if released into the atmosphere, may present an increased danger. Therefore, one embodiment of the present invention is aimed at developing a self-decontaminating fabric that automatically destroys hazardous chemicals, which attach to the protective clothing or other articles, to avoid endangering unprotected personnel.

The fillers used in the current invention are also capable of decontaminating chemical and/or biological agents (hereinafter termed as "self-decontaminating fillers"). Self-chemical and biological agent decontaminants are substances which react or interact with CBWA's and convert them into less toxic or non-toxic substances. Some fillers are capable of both increasing WVTR and self-decontamination. CWA decontamination depends on the surface area and sufficient reactivity of the adsorbent towards chemical agents. Strong adsorbance binds the agent rapidly on the affected surface and creates immediate protection. Once trapped within the solid, the adsorbate undergoes chemical change becoming harmless. The self-decontaminating fillers include, but not limited to, magnesium oxide, magnesium hydroxide, manganese oxide, zinc oxide, calcium oxide, calcium hydroxide, silver compounds, alumina, and titania.

In general, CWA break down via oxidation or hydrolysis. While all agents (HD, VX, and G-agents) are subject to breakdown from both mechanisms, HD and VX contain sulfur atoms that are readily subject to oxidation. VX and the G-agents contain bonds to a central phosphorus atom which may be subject to hydrolysis, though VX hydrolysis can result in a toxic breakdown product. As a consequence, decontaminants for CWA are preferably designed to oxidize or hydrolyze HD, oxidize VX, and hydrolyze the G-agents. Currently, there is no universal catalyst available which is capable of decontaminating all three types of CWA's. According to an embodiment of the present invention, the filler includes a mixture of one or more metal oxides, one or more decontamination catalysts, and hydrophilic polymer gel, and can decompose all three types of CWA's.

Another preferred class of CWA decontamination catalysts is polyoxometalates (POMs). POMs such as $H_5PV_2Mo_{10}O_{40}$ are coated onto sorbent polymeric matrices and used in CWA decontamination. POMs are believed to be much more effective as catalysts for CWA decontamination, when mixed with acidic polymeric gels, such as acrylic acid. Polyoxometalates undergo rapid redox changes. Several types of POM's change color when they neutralize chemical agents.

In addition to chemical decontamination, antimicrobial property can be imparted to the fabric or material of the present invention by using antimicrobial fillers, such as N-halamine compounds.

Fillers for Electromagnetic Radiation Shielding

In accordance with an embodiment of the present invention, the electromagnetic radiation filler can be a heavy metal electromagnetic radiation shielding material, such as tungsten or any tungsten-containing salt, for example, calcium tungstate. Other heavy element containing chemicals can also be used as fillers. Boron and silicon are preferably added, along with heavy element compounds, or formed as compounds of heavy elements. Other elements include, but not limited to, metals such as lead, platinum, tungsten, gold, bismuth, copper, tin, antimony and silver, metal oxides such as lead oxide, iron oxide, chrome oxide, titania, silica and aluminia, and blends thereof. The radiation shielding filler can be of various forms including, but not limited to, particulate, gel, liquid, or dispersion in a secondary medium.

Fillers for Carbon Dioxide Trapping/Absorption

In accordance with an embodiment of the present invention, polymers gel containing amine groups are preferably used as $CO_2$ absorbers. For example, Jeffamine® polyetheramines undergo reactions typical of sterically hindered primary amines. Inorganic reactive fillers including, but not limited to, magnesium hydroxide, lithium hydroxide, calcium hydroxide and magnesium oxide, can also be used as fillers for carbon dioxide trapping.

Preferred Applications of the Fabric/Material

One embodiment of the present invention includes using the fabric of the present invention as an inner liner in CBRN protective suits.

Another embodiment of the present invention includes using the fabric of the present invention in CBRN protective gloves and boots. For protection against chemicals, a wide variety of elastomeric and laminate gloves are presently available. Common materials of construction for gloves, include: latex, or natural rubber; neoprene, or polyisoprene; nitrile rubber, or acrylonitrile/butadiene/styrene rubber; butyl rubber; polyvinyl alcohol (PVA); polyvinyl chloride (PVC); and DuPont's VITON® fluoroelastomer. Laminate gloves are made by cutting and heat-sealing patterns of various hand sizes from laminated sheets of polymers. In general, the thicker is the glove material, the greater will be the permeation resistance. However, glove thickness should be considered when tactile sensation is required in addition to chemical protection. Typical glove material thickness of 10-20 mils is widely used for protection against liquid chemicals, while maintaining an effective measure of tactile sensation.

When in contact with chemicals, there are three potentially adverse consequences that might occur with these laminate and elastomeric gloves: degradation, penetration, and permeation. Degradation of the glove may result from the reaction of the chemical with the glove material or a chemical leaching of a component of the glove material, and may cause cracking, shrinking, and/or the loss of elasticity. Penetration is the passage of a liquid chemical through small openings in the glove material, such as pinholes or punctures. Permeation is the passage of a chemical at the molecular level through the intact glove material, often without any apparent evidence of this effect.

The fabric of the present invention is preferably included on the skin-contact side of the gloves in order to ensure comfort to the wearer, as well as to provide a second line protection against chemicals that may accidentally diffuse through the outer nitrile layer.

The most effective exposure control is to prevent it at the source with which a person comes in contact, through using protective equipment or apparel. Nitrile or latex gloves act as a contact barrier between the chemical agents and the person wearing them. However, their surfaces act as a source of contamination invisible to the wearer. The breathable fabric of the present invention is also capable of decontaminating these toxic chemicals or harmful agents.

Chemical protective gloves are usually impermeable in both directions, and thus sweat is unable to evaporate from the skin or from inner clothing. A buildup of moisture is uncomfortable and, if prolonged, can cause pain and injury.

The fabric layer of the present invention, along with a sweat-absorbing layer, will act as a 'fail-to-safe' control, i.e., should the top nitrile layer fail due to habitual or accidental permeation of chemicals, the worker will not be exposed to health hazards. This will also eliminate any uncertainty in usage of the gloves that is currently hampering the more effective use of gloves as personal protective equipment.

Another application of the present inventive fabric or material is its use as a chemical and/or biological decontamination wipe product.

Another application of the present invention is to use it as an air-filtration product.

Another application of the present invention is to use it in a diaper product.

Various electromagnetic radiation shielding products include, but not limited to, crew protection blanket, bomb suit, radiation suit, tent fabric and bomb blanket.

EXAMPLES

The following non-limiting examples are provided to illustrate the present invention, and do not restrict the invention in any way, manner, or form.

Example 1

The POM catalyst, $H_5PV_2Mo_{10}O_{40}$ mixed polyacrylic acid gel was used as filler in a fabric. The yellow color of the fabric gel was changed to green when mixed with 2-chloroethyl ethyl sulfide (CEES), a simulant for the chemical agent HD indicating the self-decontaminating nature of the fabric.

Example 2

In a preferred embodiment of the present invention, the first step in the filler filling or grafting is activation of the fabric surface. A scalable chemical process was developed as a method for surface activation before polyelectrolyte-gel grafting. Oxygen-plasma treatment of the fabric can also be used for surface activation. Chemicals for the surface activation of polymers were selected depending on the type of the fabric. Preferred chemicals are provided below in Table 1.

TABLE 1

Surface Activation Chemical Treatments for Polymer Membranes

| Polymer Membrane | Activation Chemicals |
|---|---|
| PCTE | 3 wt % $KMnO_4$ |
| PETE | $H_2O_2$, $(NH_4)_2S_2O_8$, $NaNO_2$ |
| PITE | $K_2Cr_2O_7/H_2SO_4$ |

Example 3

2-Acrylamido-2-methyl-1-propanesulfonic acid (AMPS) monomer was used as a precursor for the hydrophilic filling polymer gel and N,N'-methylenebisacrylamide (BisA) monomer was used as the cross-linking agent. Titania nanotubes were used as inorganic fillers along with AMPS/BisA gel (referred as 'PAMPS'). The concentration of monomer AMPS was varied from 10-30 wt % in order to obtain the best surface grafting of the gel on the polymer-membrane pores. The rate of polyelectrolyte-gel formation was increased with the amount of AMPS. After initial optimization of the concentration, 30 wt % of AMPS and 2 wt % of cross-linker BisA and 5 wt % titania nanotubes were used in the graft polymerization reactions, which seem to yield a stable gel in a reproducible manner.

The graft polymerization of acrylic acid along with titania nanotubes onto oxidized membranes can also be performed in Pyrex reaction containers under an inert atmosphere.

Example 4

Another type of filler includes 2 wt % of titania nanotubes, $H_5PV_2Mo_{10}O_{40}$ and $K_5CoW_{12}O_{40}$ for imparting chemical agent decomposition property to the polymer composite membranes.

Example 5

Membranes Infiltrated with Antimicrobial Gels

In one process, the inventive fabric was immersed in diluted chlorine bleach (approximately 1500 ppm available chlorine) containing 0.05 wt % of a nonionic wetting agent, Triton TX-100, for 90 min at room temperature. Then, the membrane was washed thoroughly with distilled water.

Example 6

Morphology

Figure 2:
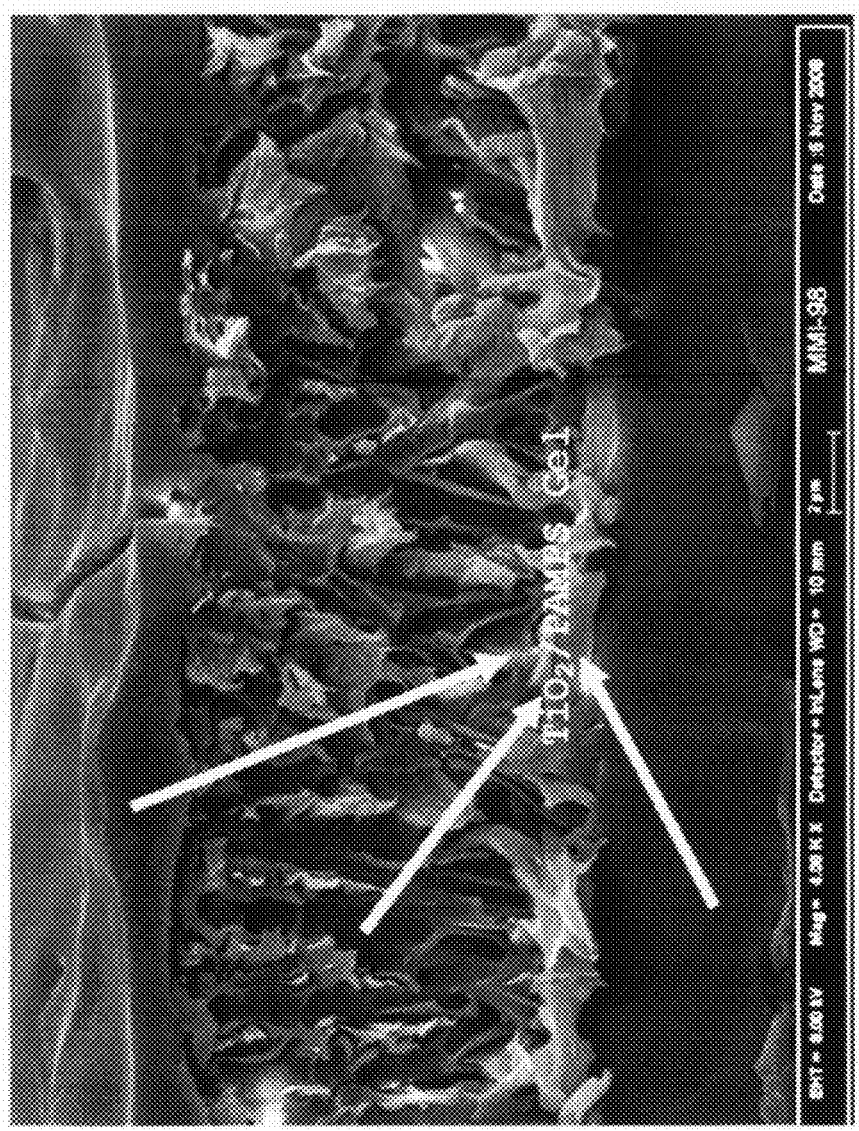
FIG. 2 is a cross-sectional SEM image of a Titania/PAMPS composite gel-filled PCTE membrane (800-nm pores)

A cross-sectional SEM image of PCTE/PAMPS/Titania composite membrane is provided in FIG. 2. The $TiO_2$-filled PAMPS gel is infiltrated through the entire pores. The top and bottom of the membrane layer are also covered with the composite gel. The cross-sectional micrographs show that the top surface of the membrane is completely covered with a layer of gel and that the pores are fully filled with crosslinked gel fibrils. The micrographs also demonstrate that a broad range of pore sizes (100 to 800 nm) can be filled by this grafting technique.

Example 7

WVTR

Water vapor transport rate (WVTR) of a set of 100-nm, 200-nm, 400-nm, 800-nm, 1.0-µm, and 2.0-µm PCTE membranes, infiltrated with PAMPS gel, was measured using the American Society for Testing and Materials (ASTM) E 96-95 standard testing method. WVTR data of a set of 800-nm membranes infiltrated with $TiO_2$ nanotubes and PAMPS mixture were also collected.

TABLE 2

Water Vapor Transport Rate Data

| Sample | Slope (g/hour) | WVTR (g/m²/day) |
|---|---|---|
| 100 nm PCTE filled | .0166 | 2587 |
| 100 nm PCTE unfilled | .0171 | 2665 |
| 200 nm PCTE filled | .0155 | 2416 |
| 200 nm PCTE unfilled | .0161 | 2509 |
| 400 nm PCTE filled | .0142 | 2213 |
| 400 nm PCTE unfilled | .0152 | 2369 |
| 800 nm PCTE filled | .0136 | 2119 |
| 800 nm PCTE filled with $TiO_2$ addition | .0150 | 2338 |
| 800 nm PCTE unfilled | .0179 | 2790 |
| 1.0 µm PCTE filled | .0162 | 2525 |
| 1.0 µm PCTE unfilled | .0179 | 2790 |
| 2.0 µm PCTE filled | .0164 | 2556 |
| 2.0 µm PCTE unfilled | .0174 | 2712 |

All the tested (gel-filled and unfilled) membranes exhibited WVTR values >2000 g/m²/day indicating their suitability as breathable membranes.

Example 8

WVTR Data of Track-Etched Polyimide (PITE) Membranes

The WVTR observed in the PITE membrane is much higher compared to that for PCTE or PETE membranes, demonstrating the significance of the quality of track-etched pores.

TABLE 3

Water Vapor Transport Rate Data of Track-Etched Polyimide Membranes

| Sample | WVTR (g/m²/day) |
|---|---|
| PITE 200-nm pores unfilled | 5906 |
| PITE 200-nm pores filled | 2395 |

Example 9

Chemical-Agents-Simulant Permeation Measurements

Vapor transport properties of the composite membranes were investigated with dimethyl methylphosponate (DMMP), which is a simulant of sarin gas, based on the ASTM E 96-95 (Standard Test Methods for Vapor Transmission of Materials) procedure.

Due to their porous structure, porous track-etched polymer membranes exhibit high permeability to both water and DMMP vapor. A distinct reduction in DMMP-vapor permeability was observed when pores were filled with PAMPS. The reduction in permeability is more marked in the case of $TiO_2$-mixed PAMPS gel. These results demonstrate the effect of $TiO_2$ on reducing the chemical diffusion of DMMP-vapor while retaining the higher WVTR.

TABLE 4

DMMP-Transport Properties of PCTE and Polymer Nanocomposites

| PCTE Pore Diameter (μm) | Unfilled DMMP Transport Rate (g/m²/day) | Filled DMMP Transport Rate (g/m²/day) |
|---|---|---|
| 0.2 | 148.63 | 72.42 |
| 0.4 | 135.49 | 103.79 |
| 0.8 | 149.10 | 80.51 |
| 0.8 (with $TiO_2$) | 149.10 | 51.08 |
| 1.0 | 149.10 | 91.54 |

Vapor-Transport Rate (VTR) provides the transport rate for a given permeate through a membrane. However, VTR does not account for the thickness of the membrane effectively. More specifically, VTR will have different values for the same material if it varies in thickness. To accurately compare materials independent of processing thickness, the effective permeability must be calculated. Effective permeability, ($P_{eff}$), can be expressed as:

$$P_{eff} = [L*VTR]/[S*(P_1 - P_2)]$$

where S is the saturation vapor pressure (mm Hg) at the test temperature, $P_1$ is the partial pressure or relative humidity on the challenge side, $P_2$ is the partial pressure on the exit side, and L is the sample thickness. Saturation vapor pressure for water at 35° C. is 41.175-mm Hg, and for DMMP at 35° C., it is 6.77-mm Hg. In Table 5 (below), effective permeability, $P_{eff}$, data for water and DMMP for the membranes studied are provided.

TABLE 5

Effective Permeability, $P_{eff}$, Data for Water and DMMP for Various Polymer Membranes

| Membrane | Water $P_{eff}$ g/mmHg/m/day | DMMP $P_{eff}$ g/mmHg/m/day |
|---|---|---|
| 0.2 μm | 8.6026 | 3.0994 |
| 0.2 μm filled | 8.2837 | 1.5102 |
| 0.4 μm | 8.1226 | 2.8254 |
| 0.4 μm filled | 7.5877 | 2.1644 |
| 0.8 μm | 9.5661 | 3.1092 |
| 0.8 μm filled | 7.2654 | 1.6789 |
| 0.8 μm $TiO_2$ | 8.0163 | 1.0652 |
| 1 μm | 9.5661 | 3.1092 |
| 1.0 μm filled | 8.6575 | 1.9089 |

Example 10

Selectivity values for 800 nm pore membrane samples examined in these experiments are provided in Table 6 (below). Selectivity does not account for the actual amount of permeate going through a membrane. A material that has high values for effective permeation for both permeants may have the same selectivity as a material that has low values for both permeants. Therefore, generally selectivity cannot be used as a final criterion, but rather should be used in conjunction with $P_{eff}$ values of water. However, in the present invention, the water-vapor transport for all materials provide sufficient breathability, and therefore, materials with the highest selectivity's have the desired properties for breathable protective clothing. The selectivity of a nanocomposite membrane is higher than that of a nanoporous membrane. This selectivity is further enhanced by the addition of $TiO_2$ nanotubes in the polyelectrolyte gel.

TABLE 6

Selectivity Values of Various Breathable Membranes

| Membrane | Selectivity |
|---|---|
| 0.8 μm (Pristine) | 3.0 |
| 0.8 μm (PAMPS) | 4.3 |
| 0.8 μm ($TiO_2$/PAMPS) | 7.5 |
| Military Chemical Suit | 2 |

Example 11

Chemical Suit Configuration and Weight Calculations

A military chemical suit was procured from a commercial vendor and compared with the nanocomposite membranes of the current invention. A small piece (4"×4") of the chemical-suit fabric was cut and individual layers were weighed. (Photographs of the preferred military chemical-suit layers are provided in FIG. 3.) A comparison of the military chemical suit and the nanocomposite membrane suit are provided in Table 7 (below). The weight of the nanocomposite membrane is negligible when compared to the weight of activated carbon liner. However, the weight of the outer and inner layers also contribute to the total weight of the chemical suit. Overall, a 47% weight reduction can be achieved by replacing the carbon liner with the nanocomposite membrane liner.

TABLE 7

Comparison of the Military Chemical Suit and the Inventive Fabric Suit

| Material | Military chemical suit g/m² | Inventive fabric g/m² |
|---|---|---|
| Outer Layer | 169 | 169 |
| Inner Layer | 78 | 78 |
| Chem. Liner | 234 | 7 |
| Total Chem. Suit Weight | 480 | 253 |

Example 12

Preparation of Base Fabric Loaded with Inorganic Particulates

Magnesium hydroxide nanoplatelets were surface-treated with 1% by weight of aminopropyltrimethoxysilane in order to increase the adhesion to the nylon matrix. Nanocomposite pellets containing 5-60 wt % of surface-treated magnesium hydroxide in nylon matrix was processed in a twin-screw extruder. A round single-hole spinneret having 0.6-mm or 1.0-mm diameter was used to produce the as-spun filament. Spinning temperature was varied from 210 to 240° C., and spinline length, between the spinneret face and take-up godet, was varied from 2 to 5 meter. Their influence on the spinnability and properties of the resultant fiber samples will be determined. The maximum loading of Magneisum hydroxide nanoplatlets will be determined by the spinnability of the compounded material. The spun fibers were weaved into textile fabrics.

Example 13

In this example, magnesium hydroxide was replaced with bismuth containing oxide particulates and nylon/bismuth compound fabrics were fabricated.

Example 14

Electro-Spinning of Bismuth Containing Nanofiber Fabrics

In one process, the precursor solution for bismuth containing nanofiber was prepared by adding specified amounts of bismuth nitrate, trimethyl borate, and tetraethyl orthosilicate to 20 mL of dimethyl formamide (DMF). The mole fraction ratio of bismuth nitrate to trimethyl borate and tetraethyl orthosilicate was varied. Polyacrylonitrile (PAN) polymer was added to this solution and heated until it turned into a transparent and viscous solution. This viscous solution was then electrospun onto a mandrel at a distance of approximately 10 cm with a voltage of 20 kV to create bismuth borosilicate composite nanofibers.

Based on the weight of the sample after pyrolysis and the black color of the sample, it can be inferred that the PAN polymer resulted in the production of carbon fibers. These carbon fibers provide mechanical stability to the radiation-shielding fabric. In contrast, samples heated in air crumbled into powder without any structural integrity. Thus development of the inorganic nanofiber mats will be based on heat treatment under inert gases such as argon and nitrogen.

Figure 4:
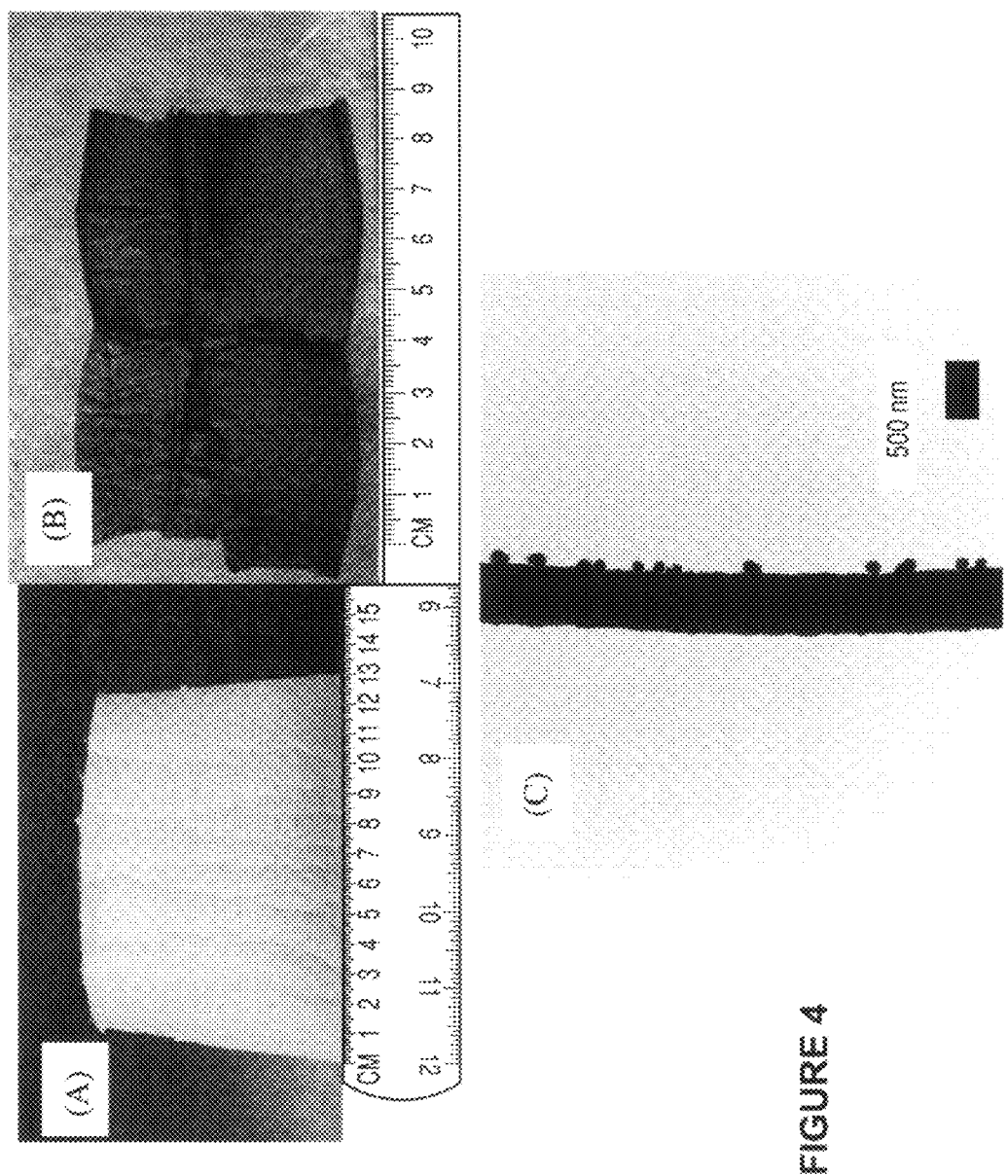
FIG. 4 are photographs of electrospun bismuth oxide/PAN samples (A) before and (B) after pyrolysis (defects/markings on the fabric resulted from folding of the sample) (C) TEM (transmission electron microscope) micrographs of electrospun bismuth oxide particle-embedded carbon fibers.

Transmission electron microscopic (TEM) images of argon-annealed electrospun fibers are provided in FIG. 4. The TEM micrograph of the sample exhibited fibers approximately 650 nm in diameter.

In addition to being flexible, it is preferred that the fabric or material have a high water-vapor transport rate so as to be breathable. To test the breathability of the bismuth borosilicate material, the water-vapor transport rate of the argon-pyrolyzed sample was measured. The water-vapor transport rate was 1871±28 g/m$^2$·day, which is in the range desired for breathability (>1000 g/m$^2$·day).

While it is advantageous to have a breathable fabric or material with a high water-vapor transport rate, it is not desirable to have defect in the fabric that could allow X-rays or gamma-rays to penetrate through the material. Therefore, heavy element containing fillers can be infiltrated into the nanopores of the electrospun samples that would provide breathability, yet there would be greater shielding against X-rays and gamma rays due to the added heavy metal filler.

Example 15

Preparation of Heavy Metal-Filled, Nanoporous-Fabrics

Figure 5:
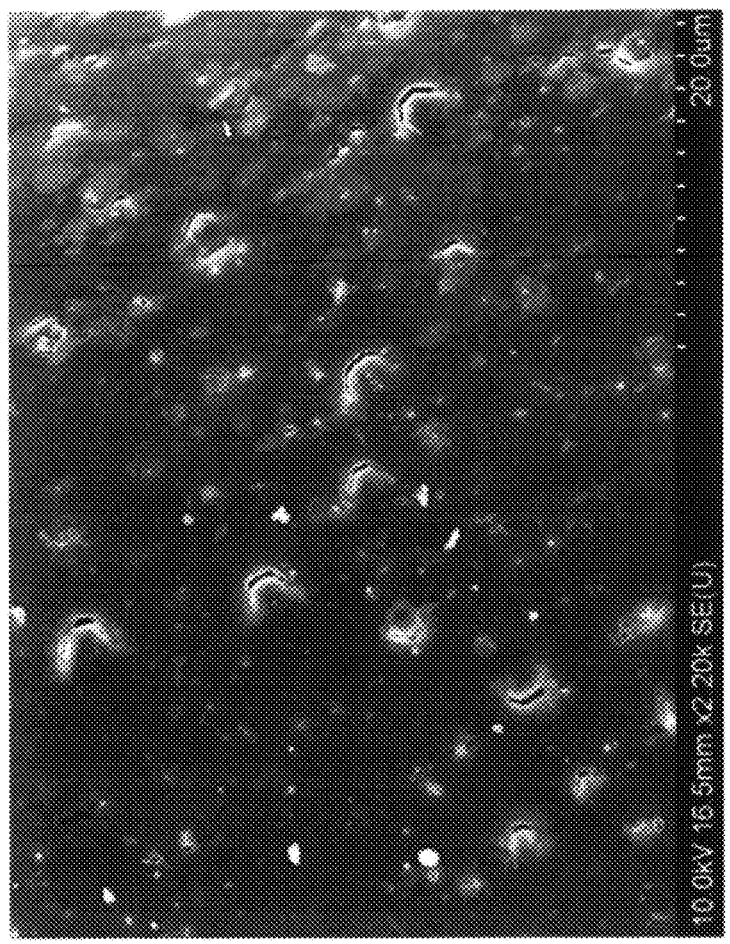
FIG. 5 is a transmission electron microscope (TEM) image of bismuth metal filled track-etched membrane.

In accordance with an embodiment of the present invention, another method was developed for breathable radiation shielding fabric using track-etched nanoporous membranes. In this method, a set of track-etched membrane samples were infiltrated with a bismuth nitrate solution. After infiltration, the membranes were removed and placed in a sodium borohydride solution. The sodium borohydride solution reduced the bismuth nitrate, resulting in covering of the membranes and filling of the pores with elemental bismuth. A fabric infiltrated with nano-bismuth metal particles will have the shielding benefits, as well as the flexibility and breathability, of a textile material. Water vapor is expected to diffuse through the hydrophilic and bismuth containing pores (FIG. 5).

A series of experiments was performed in order to optimize bismuth infiltration into porous membranes. Reaction parameters, such as type of solvent, infiltration-time, bismuth nitrate and sodium borohydride concentrations, and reaction temperature and duration, were investigated in order to determine the best processing conditions for fabricating a high-bismuth-content fabric. The optimum process conditions include: use of alcohol and dilute sodium borohydride solution, longer infiltration time, and highly concentrated bismuth nitrate solution.

Example 16

Figure 6:
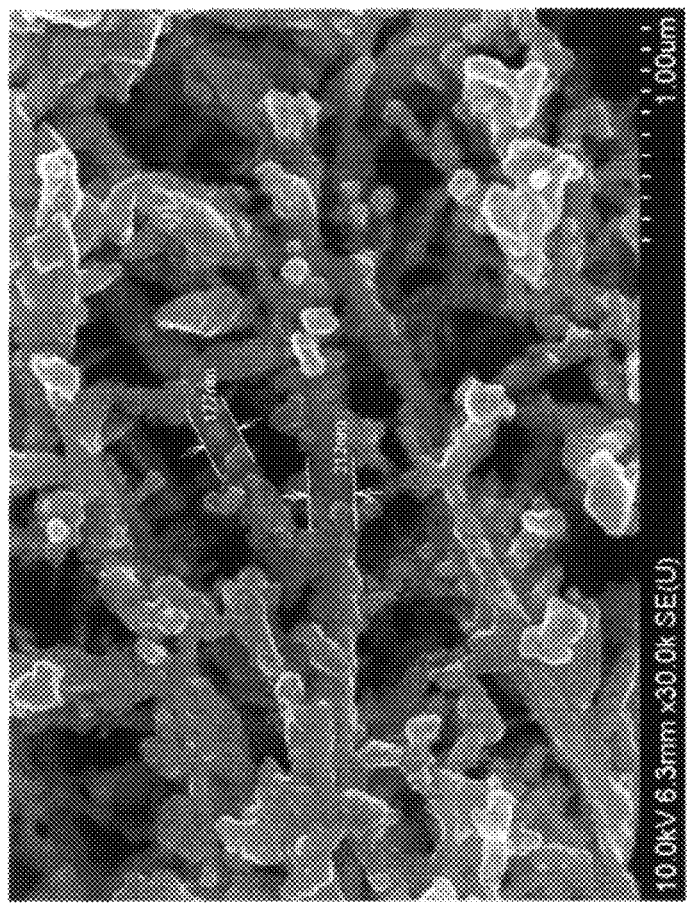
FIG. 6 is a TEM image of bismuth nanometal rods.

Another aspect of the bismuth-infiltrated membranes discussed in Example 15 (above) is their serving as a potential route for creating metal nanorods or nanoribbons. After infiltration, the pores were completely filled with bismuth nitrate. The fabric surface was thoroughly washed to remove excess bismuth nitrate. The structure of the pores was preserved, leaving neatly prepared bismuth rods with a diameter corresponding to that of pristine porous fabric. The size and shape of these samples were analyzed using SEM, and a pertinent micrograph is provided in FIG. 6.

Example 17

$^{137}$Cs Gamma-Radiation-Shielding Properties of the Inventive Fabrics

Figure 3:
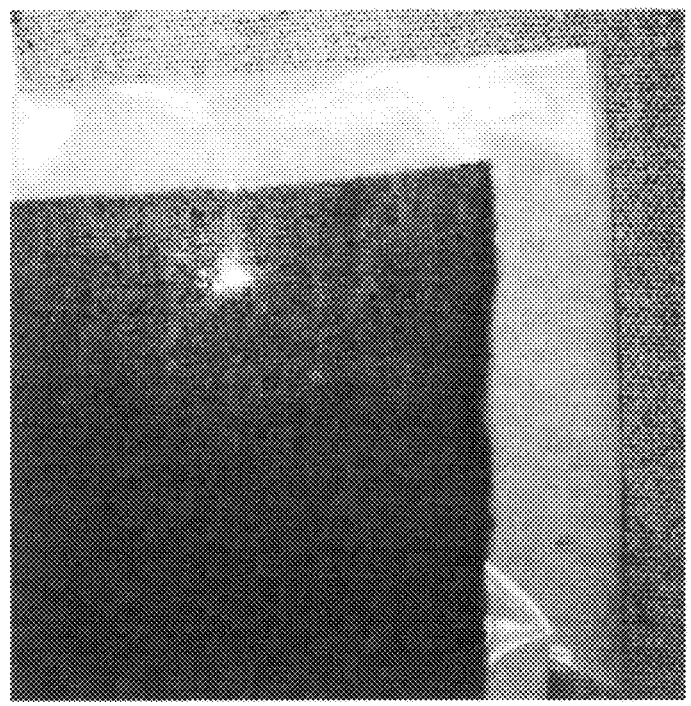
FIG. 3 are photographs of preferred architecture of (A) the JSLIST chemical suit [(1) Inner Liner Fabric, (2) Breathable Carbon liner w. 1× Selectivity, and (3) Outer Shell Fabric]; and (B) Nanocomposite-membrane-based chemical suit [(1) Inner Liner Fabric, (2) Breathable Membrane w. 4× Selectivity (3) Outer Shell Fabric]
Figure 3:
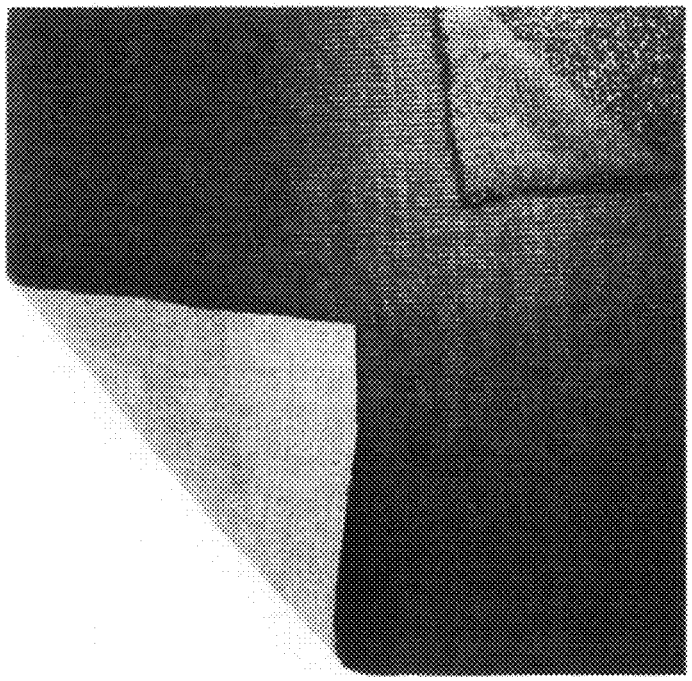
Figure 3:
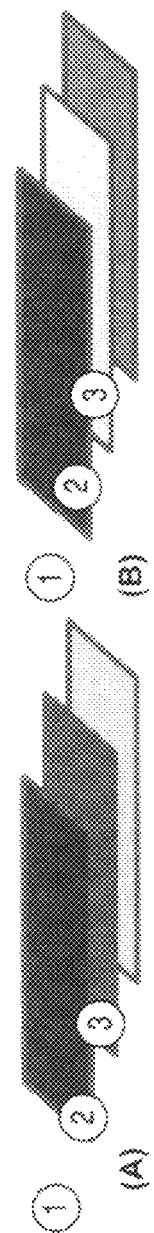
Figure 3:
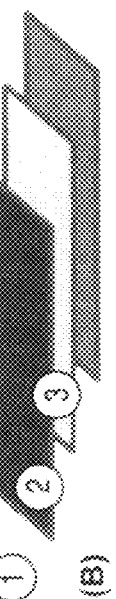

Gamma ray attenuation experiments were performed using standard-beam $^{137}$Cs-662 keV energy gamma radiation. Gamma-ray-attenuation measurements were taken for varying thickness of the samples. For each type of material, stacks of various thickness were used. In FIG. 3, photographs of the radiation-shielding test samples are provided. In each case, the slabs were stacked together and placed in between the $^{137}$Cs source and the ionization chamber detector. Details of the experimental setup and conditions are listed below:

| | |
|---|---|
| NIST Beam code | $^{137}$Cs |
| Air Kerma Rate | 5.54 × 10$^{-4}$ Gy/s |
| Source-to-Detector Distance | 87 cm |
| Detector | Exradin ionization chamber model A3, SN 162 |
| Field Size at Detector Position | 13 cm × 13 cm |
| Sample Orientation | The front face was normal to the incidence radiation |
| Transmission Ratio | The ratio of the ionization currents generated in the ionization chamber obtained with the sample in the beam and with the sample removed. |

Breathable fabrics made in accordance with Example 17, weigh less (14% less weight) than lead for the equivalent gamma radiation shielding.

Figure 7:
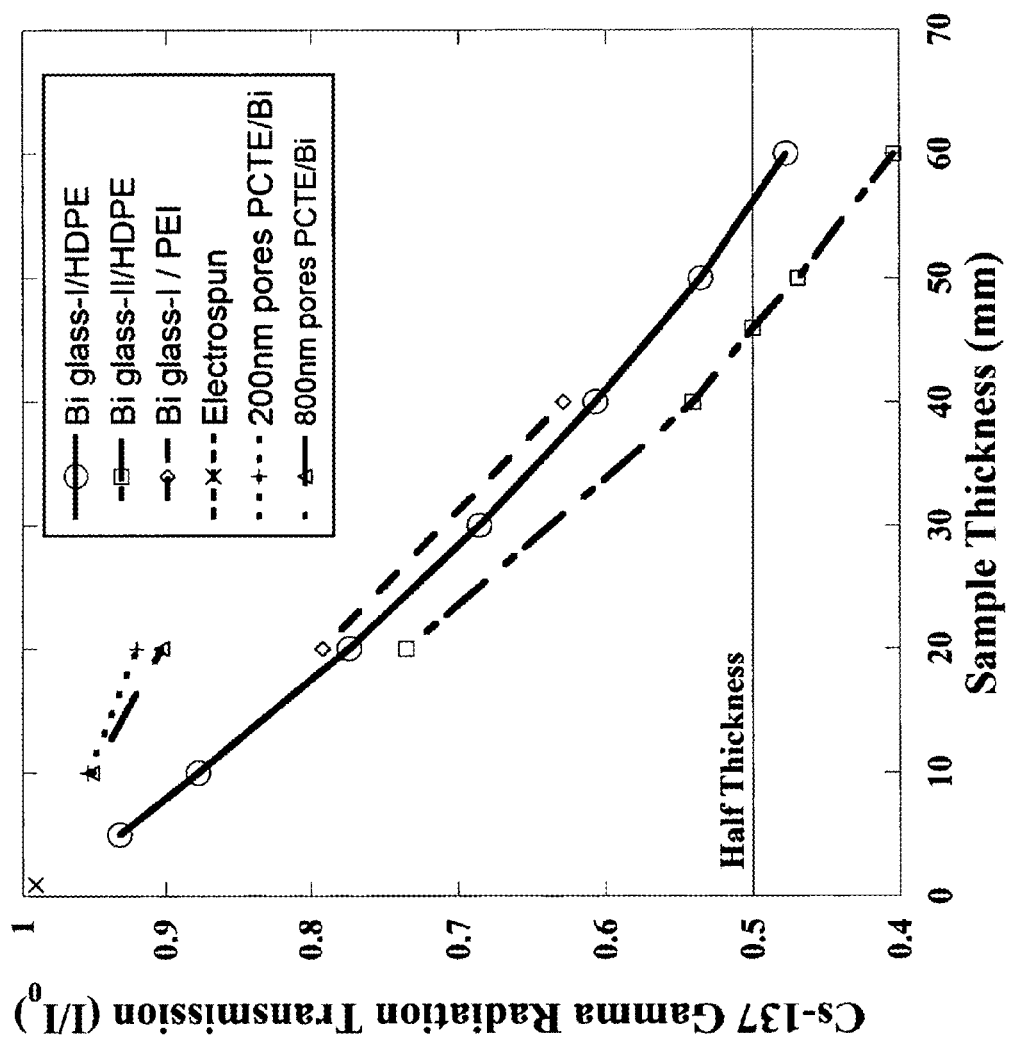
FIG. 7 is a graphical representation of $^{137}Cs$ gamma radiation (662 keV) attenuation by the radiation shielding fabric of the present invention.
Figure 8:
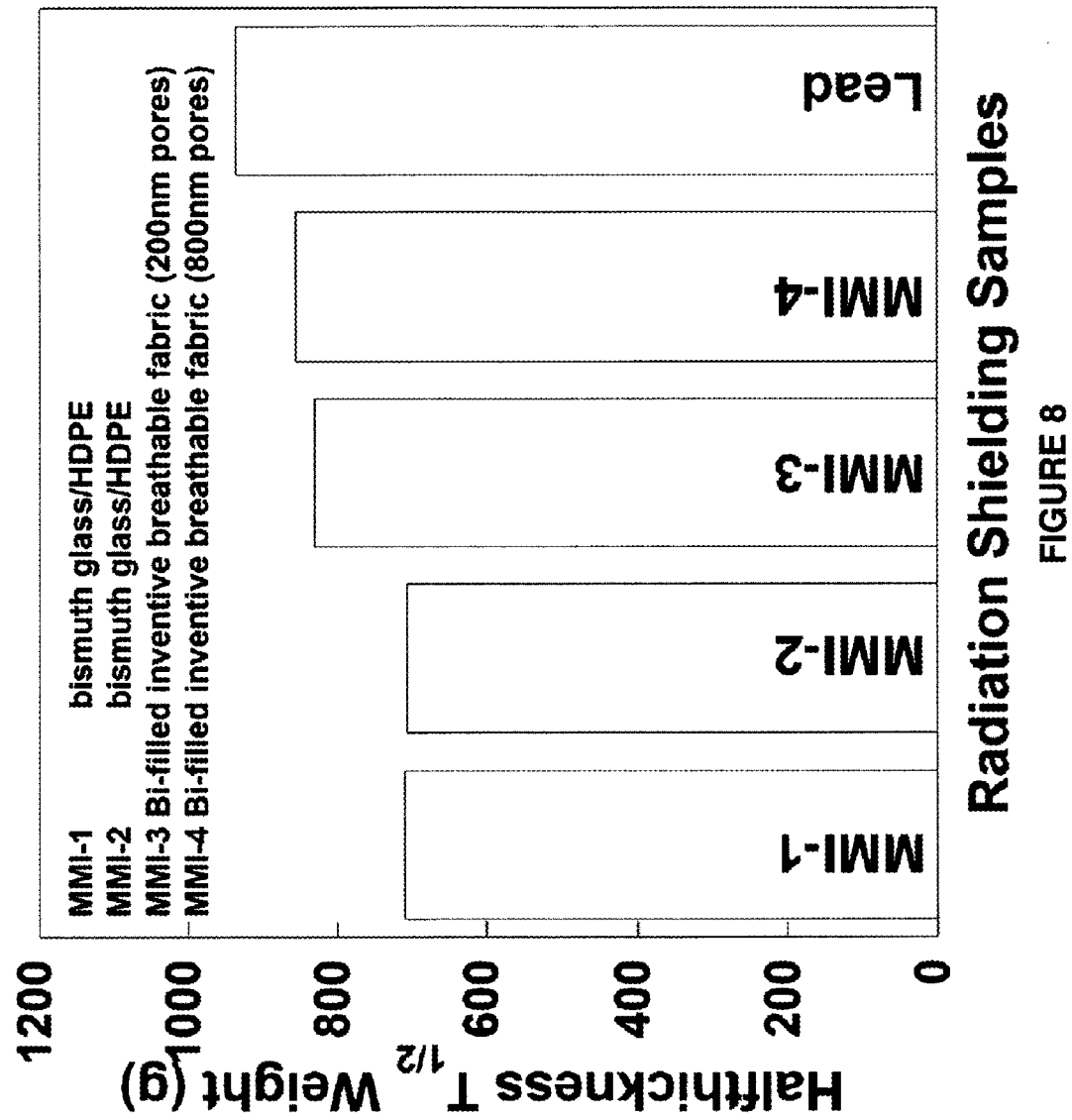
FIG. 8 is a weight comparison of various radiation-shielding fabrics developed in accordance with preferred embodiments of the present invention (designated as MMI-1, MMI-2, MMI-3 and MMI-4) with lead for the equivalent gamma radiation shielding (HVL thickness).

The $^{137}$Cs gamma radiation attenuation data for the stacks of radiation shielding materials at various thickness is provided in FIG. 7. Half value layer (HVL) corresponds to thickness of the material required to reduce the intensity of incidence radiation by half (50%). The HVL values of inventive fabrics were calculated from the data in FIG. 7 and provided in Table 3. A horizontal line corresponding to the HVL is included in the FIG. 7 for the ease of HVL calculation of various test samples.

Example 18

Another embodiment of the present invention is the use of track-etched membranes as casting templates for developing nanostructured materials. Track-etched polymer membranes, which have straight cylindrical pores that are oriented normal to the plane of the membrane, provide a promising platform to design membranes with nano-domains with high aspect ratios oriented in the desired direction. Track-etched membranes are commercially available in polyester and polycarbonate forms with various thicknesses (6 micron or above), pore sizes (10 nm to microns), and porosities (0.05 percent to 20 percent). By using this membrane and pouring over it a castable polymer layer, the castable polymer, successfully infiltrated into the membrane, will form protrusions. These protrusions become permanent by curing the castable polymer in place and then removing it from the track-etched membrane.

Example 19

Sylgard® parts 1 and 2 were mixed together in a recommended 10:1 ratio, and then poured onto a Sterlitech 5.0 micron polycarbonate track-etched membrane. The polymer was cured for 72 hours, and then heated at 70° for 1 hour before chloroform was used to help dissolve of the PCTE membrane.

The fabric or material of the present invention has one or more of the properties including, but not limited to, the following:

Higher efficacy in screening out of the toxic chemical and/or biological agents
Protect against electromagnetic radiation in the range of microwaves to X-rays to gamma rays
Reduction in the weight of the overall protection article
Improved comfort to the wearer by reducing heat stress and/or improved breathability
Non-toxic to the wearer
Mechanically stable wear and tear resistance.

An effective protection can be provided by clothing or other article using the fabric or material of the invention that is capable of adsorption or detoxification of one or more of the harmful agents. Non-limiting examples include a suit, blanket, tent, glove, boot, mask, covering, and an article or structure mimicking a naturally occurring article or structure.

When designing a protective clothing, it is important to consider not only protection against the harmful agents, but also attainment of comfort. The fabric or material of the invention is breathable and has a high water vapor transport rate, thereby enhancing the comfort level for the user.

Various forms of electromagnetic radiation protection articles that can be made using the fabric or material of the invention include, but not limited to, bomb suit, radiation suit, radiation blanket, bomb blanket, radiation protection tent, crew blanket, and radiation protection gloves.

The following is a list of the abbreviations used in the present disclosure.

| Abbreviation | Explanation |
|---|---|
| AMPS | 2-Acrylamido-2-methyl-1-propanesulfonic acid |
| ASTM | American Society for Testing and Materials |
| BisA | N,N'-methylenebisacrylamide |
| CNRN | Chemical, biological, radiological and nuclear |
| CBWA | Chemical and biological warfare agent |
| CEES | 2-chloroethyl ethyl sulfide (chemical agent) |
| CWA | Chemical warfare agent |
| DEA | Diethanolamine |
| DGA | Diglycolamine |
| DMF | Dimethyl formamide |
| DIPA | Diisopropanolamine |
| DMMP | Dimethyl methyl phosphonate (chemical agent) |
| HVL | Half value layer |
| MDEA | Methyldiethanolamine), |
| MEA | Monoethanolamine |
| PAMPS | Poly (2-Acrylamido-2-methyl-1-propanesulfonic acid) |
| PAN | Polyacrylonitrile |
| PCTE | polycarbonate |
| PETE | polyester |
| PITE | polyimide |
| POM | polyoxometalate |
| PVA | polyvinyl alcohol |
| PVC | polyvinyl chloride |
| RDD | Radioactive-dispersal-devices |
| SEM | Scanning electron microscopic |
| TEA | Triethanolamine |
| TEM | Transmission electron microscopic |
| WVTR | water vapor transport rate |

While this invention has been described as having preferred sequences, ranges, steps, materials, structures, components, features, and/or designs, it is understood that it is capable of further modifications, uses, and/or adaptations of the invention following in general the principle of the invention, and including such departures from the present disclosure as those come within the known or customary practice in the art to which the invention pertains, and as may be applied to the central features hereinbeforesetforth, and fall within the scope of the invention and of the limits of the appended claims.

REFERENCES

The following references, and any cited in the disclosure herein, are hereby incorporated herein in their entirety by reference.

1. H. Chen, G. R. Palmese, Y. A. Elabd, Membranes with Oriented Polyelectrolyte Nanodomains, Chem. Mater., 18, 4875-4881 (2006).
2. H. Chen, A. M. Rahmathullah, G. R. Palmese, Y. A. Elabd, Polymer-Polymer Nanocomposite Membranes as Breathable Barriers with Electro-Sensitive Permeability; In Nanoscience and Nanotechnology for Chemical and Biological Defense. Nagarajan, R. Ed.; ACS Symposium Series; Oxford University Press. (2008).
3. Y. A Elabd, G. R. Palmese, Filled nanoporous polymer membrane composites for protective clothing and methods for making them, US Patent application, 20100160466 (2010).
4. K. Mitshuishi, S. Komada, H. Kawasaki, Mechanical properties of oriented porous polypropylene filled with modified calcium carbonate, J. Mater. Sci. Lett. 6, 434 (1987).
5. D. L. Green, L. McAmish, A. V. McCormick, Three-dimensional pore connectivity in bi-axially stretched microporous composite membranes, Journal of Membrane Science, 279, 100-110 (2006).
6. L. C. Wadsworth, H. C. Allen, Development of highly breathable and effective blood/viral barrier laminates of 7. H. L. Schreuder-Gibson, Q. Truong, J. E. Walker, J. R. Owens, J. D. Wander, W. E. Jones Jr., Chemical and Biological Protection and Detection in Fabrics for Protective Clothing, MRS Bulletin, 574-578 (2003).
8. G. W. Wagner, O. B. Koper, E. Lucas, S. Decker, K. J. Klabunde, J. Phys. Chem. B, 104, 5118 (2000).
9. K. J. Klabunde, J. Stark, O. Koper, C. Mohs, D. G. Park, S. Decker, Y. Jiang, I. Lagadic, D. Zhang, J. Phys. Chem., 100, 12142 (1996).
10. G. W. Wagner, L. R. Procell, R. J. O'Connor, S. Munavalli, C. L. Carnes, P. N. Kapoor, K. J. Klabunde, J. Am. Chem. Soc. 123, 1636 (2001).
11. R. D. Gall, C. L. Hill, J. E. Walker, Selective Oxidation of Thioether Mustard (HD) Analogs by tert-Butylhydroperoxide Catalyzed by $HPV_2Mo_{10}O_{40}$ Supported on Porous Carbon Materials, J. Catalysis, 159, 473-478 (1996).
12. P. J. Domaille, 1- and 2-Dimensional tungsten-183 and vanadium-51 NMR characterization of isopolymetlates and heteropolymetalates, J. Am. Chem. Soc. 106, 7677-7687 (1984).
13. M. R. Badrossamay, G. Sun, Acyclic halamine polypropylene polymer: Effect of monomer structure on grafting efficiency, stability and biocidal activities, Reactive & Functional Polymers 68 1636-1645 (2008).
14. ASTM E 96-95. Standard Test Methods for Vapor Transmission of Materials. Annu. Book of ATM Stand. (2002).
15. Handbook of Chemistry and Physics; 66th Edition; CRC Press Inc.: Florida, 1985.
16. The Merck Index. An Encyclopedia of Chemicals, Drugs, and Biologicals, 13th Ed; Merck and Co., Inc.: Whitehouse Station, N.J., (2001).
17. W. Mayer, U. Mohr, M. Schrierer, High-tech Textiles: Contribution made by Finishing, in an Example of Functional Sports and Leisurewear, International Textile Bulletin, 35, 16-32, (1989).
18. R. Roth, Current Status of Research, Development, and Testing of Fabrics for Chemical/Biological Warfare. Presentation by R. Roth to the Outlook '82 IFAI 23rd Conference, New York, May 19, 1982.
19. Standard Test Method for Thermal and Evaporative Resistance of Clothing Materials Using a Sweating Hot Plate, ASTM 1868-2, ASTM International, West Conshohocken, Pa.
20. E. H. Harrison, S. A. Procell, M. J. Gooden, A. D. Seiple, Test Results of Air-permeable Saratoga™ Hammer Suit to Challenge by Chemical Warfare Agents, ECBC Report (March 2004).
21. Standard Specification for Coated Fabrics-Waterproofness, ASTM D 3393-91 (2005) ASTM International, West Conshohocken, PA.Standard Test Method for Flame Resistance of Textiles (Vertical Test), ASTM D6413-08.
22. Standard Guide for Abrasion Resistance of Textile Fabrics (Rotary Platform, Double-Head Method) ASTM D 3884.
23. Y. Lee, S. Chadha, A. Riecker, T. Mendum, J. Puglia; "Dynamic nanocomposite self-deactivating fabrics for the individual and collective protection," Foster-Miller, Inc. Watham, Mass.
24. Q. Truong and D. Rivin, Evaluation of CHEMPAK Light™ Membrane for Chemical/Biological Protective Clothing, NATICK/TR-96/023L (U.S. Army Natick Research, Development, and Engineering Center, Natick, Mass. (1996).
25. J. Lin, C. Winkelmann, S. D. Worley, J. Kin, C.-I. Wei,k U. Cho, R. M. Broughton, J. I. Santiago, and J. F. Williams, J. Appl. Polym. Sci. 81 p. 943 (2001).
26. G. Sun and X. Xu, Textile Chemist and Colorist 30, 26 (1998).
27. G. Sun and X. Xu, Textile Chemist and Colorist 31, 31 (1999).
28. J. Lin, C. Winkelmann, S. D. Worley, J. Kin, C.-I. Weik, U. Cho, R. M. Broughton, J. I. Santiago, and J. F. Williams, J. Appl. Polym. Sci. 85, 177(2002).
29. S. D. Worley, F. Li, R. Wu, J. Kim, C. K. Wei, J. F. Williams, J. R. Owens, J. Wander, A. M. Bargmeyer, and M. E. Shirtlif, Surf. Coat. Int., Part B, Coat. Trans. (2003).
30. H. L. Schreuder, P. Gibson, K. Senecal, M. Sennett, J. Walker, W. Yeomans, D. Ziegler, and P. T. Tsai, J. Adv. Mater. 34, 44 (2002).
31. P. S. Hammond, J. S. Forester, C. N. Lieske, and H. D. Durst, J. Am. Chem. Soc. 111, 7860 (1989).
32. Johnson R P, Hill C L, Polyoxometalate oxidation of chemical warfare agent simulants in fluorinated media, J. Applied Toxicology, 19, S71-S75, Supplement: Suppl. 1 (1999).
33. U.S. Markets for (CBN) Industrial Protective Apparel, F586-39, Frost & Sullivan (2006).
34. P. A. Karam, Radiological Terrorism, Human and Ecological Risk Assessment, 11, 501-523, (2005).
35. H. Vogel, Rays as weapons, European Journal of Radiology, 63, 167-177 (2007).
36. T. L. McGehee, V. F. Medina, R. M. Martino, A. J. Bednar, C. A. Weiss, Jr. D. Abraham Fixation of Heavy Contaminants of a Dirty Bomb Attack: Studies with Uranium and Metal Simulants, Environmental Progress, 26, 94-103 (2007)
37. http://www.fas.org/spp/starwars/crs/RS21766.pdf.
38. H. L. Schreuder-Gibson, P. Gibson, K. Senecal, M. Sennett, J. Walker, W. Yeomans, J. Adv. Mater. 34, 44-55 (2002).
39. C. L. Shao, H. Y. Kim, J. Gong, D. R. Lee, Nanotechnology, 13, 635 (2002)
40. S. Ramakrishna, K. Fujihara, W. Teo, T. Lim, Z. Ma, An introduction to electrospinning and nanofibers; World Scientific: Singapore, (2005).
41. Standard Guide for Abrasion Resistance of Textile Fabrics (Rotary Platform, Double-Head Method) ASTM D 3884.
42. P. J. Lamperti, and M. O'Brien, NIST Measurement Services: Calibration of X-Ray and Gamma-Ray Measuring Instruments, Natl. Inst. Stand. Technol. Spec. Publ. 250-58 (2001).
43. K. Singh, H. Singh, V. Sharma, R. Nathuram, A. Khanna, R. Kumar, S. S. Bhatti, H. S. Sahota, Gamma-ray attenuation coeffcients in bismuth borate glasses, Nuclear Instruments and Methods in Physics Research B, 194, 1-6, (2002).
44. S. Xu, M. Bourham, A. Rabiei, A novel ultra-light structure for radiation shielding Materials and Design, 31, 2140-2146 (2010).
45. K. Autumn, Properties, Principles, and Parameters of the Gecko Adhesive System, pp. 225-256, Bioadhesives (Ed. AM. Smith and JA. Callow) Springer-Verlag, Heidelberg 2006.
46. M. Sitti and R. S. Fearing, J. Adhesion Sci. Tech., 17 [8], 1055, 200.

47. A. K. Geim, S. V. Dubonos, I. V. Grigorieva, K. S. Novoselov, A. A. Zhukov and S. Yu. Shapovale, Nature Materials, 2 [7], 461, 2003.
48. E. Kim, Y. Xia, and G. M. Whitesides, "Polymer Microstructures Formed by Moulding in Capillaries," Nature 376, 581-582, 1995.
49. S. Y. Chou, P. R. Krauss, and P. J. Renstrom, "Imprint of Sub-25 nm Vias and Trenches in Polymers," Appl. Phys. Lett. 67, 3114-3120, 1995.
50. Kumar, H. A. Biebuyck, and G. M. Whitesides, "Patterning SAMs: Applications in Materials Science," Langmuir 10, 1498-1510, 1994.
51. T. S. Kustandi, V. D. Samper, W. S. Ng, A. S. Chong, H. Gao, Fabrication of a gecko-like hierarchical fibril array using a bonded porous alumina template, J. Micromech. Microeng. 17 (2007) N75-N81.
52. Morin and A. Dufresne, Macromolecules, 35, 2190, 2002. (b) K. Fleming, D. G. Gray and S. Matthews, Chem. Eur. J., 7, 1831, 2001.
53. Noorani, Sweda., Cellulose/Polysulfone nanocomposites, in Department of Chemical Engineering and Wood Science. 2006, Oregon State University: Corvallis, Oreg.
54. Gomez-Bujedo, S., E. F. and M. R. Vignon, Preparation of Cellouronic Acids and Partially Acetylated Cellouronic Acids by TEMPO/NaClO Oxidation of Water-Soluble Cellulose Acetate. Biomacromolecules, 2004. 5: p. 565-571.
55. C. Menon, M. Murphy, M. Sitti, "Gecko Inspired Surface Climbing Robots" IEEE International Conference on Robotics and Biomimetics (ROBIO), Shenyang, China, August 2004.
56. K. Autumn, A. Dittmore, D. Santos, M. Spenko and M. Cutkosky, Frictional Adhesion: A New Angle on Gecko Attachment, The Journal of Experimental Biology 209, 3569-3579; (2006).
57. Jun Liu, Guozhong Cao, Xiaodong Zhou, Zhenguo Yang, Gordon L. Graff, Donghai Wang, Larry R. Pederson, Dan Dubois, Ji-Guang Zhang, Oriented Nanostructures for Energy Conversion and Storage, Chem. Sus. Chem., 1,676-697 (2008).
58. J. Minnich, M. S. Dresselhaus, Z. F. Ren and G. Chen, Bulk nanostructured thermoelectric materials: current research and future prospects, Energy Environ. Sci., 2, 466-479 (2009).

What is claimed is:

1. A breathable material for protection against electromagnetic radiation, the breathable material consisting of a single layer, the single layer comprising:
   a) a base material comprising pores, wherein the pores are entirely filled with an inorganic filler and a breathability agent;
   b) said inorganic filler comprising at least one radiation shielding agent selected from the group consisting of bismuth, bismuth compound, and a combination thereof;
   c) said breathability agent comprising a hydrophilic polymer gel of 2-acrylamido-2-methyl-1-propanesulfonic acid (AMPS),
   d) wherein the breathable material for protection against electromagnetic radiation comprises a water vapor transport rate ranging from about 100 g/m$^2$/day to about 1871 g/m$^2$/day, and wherein the breathable material for protection against electromagnetic radiation is effective against radiation ranging from x-rays to gamma rays.

2. The breathable material for protection against electromagnetic radiation of claim 1, wherein:
   a) said base material comprises at least one member selected from the group consisting of track-etched polymeric membrane, microporous membrane, polymer sheet, porous polymer sheet, inorganic membrane, inorganic fabric, organic fabric, and a combination thereof.

3. The breathable material for protection against electromagnetic radiation of claim 1, wherein:
   a) said base material comprises at least one member selected from the group consisting of polyester, nylon, aramid, cotton, and a combination thereof.

4. The breathable material for protection against electromagnetic radiation of claim 1, wherein:
   a) said base material comprises a woven or non-woven material.

5. An article comprising the breathable material for protection against electromagnetic radiation of claim 1.

6. A suit, blanket, tent, glove, boot, mask, covering, an article or structure mimicking a naturally occurring article or structure, or an article of clothing comprising the breathable material for protection against electromagnetic radiation of claim 1.

7. The breathable material for protection against electromagnetic radiation of claim 1, wherein:
   a) said inorganic filler further comprises at least one metal selected from the group consisting of lead, platinum, gold, copper, tin, antimony, silver, and a combination thereof.

8. The breathable material for protection against electromagnetic radiation of claim 1, wherein:
   a) said inorganic filler further comprises at least one metal oxide selected from the group consisting of bismuth oxide, boron oxide, lead oxide, iron oxide, chrome oxide, titanium oxide, silicon oxide, aluminum oxide, and a combination thereof.

9. The breathable material for protection against electromagnetic radiation of claim 1, wherein:
   a) said inorganic filler comprises nanoparticles, microparticles, nanowires, nanotubes, nanoscrolls, or nanoflakes, or a combination thereof.

10. The breathable material for protection against electromagnetic radiation of claim 1, wherein:
    a) said inorganic filler comprises crystalline material, amorphous material, or a combination thereof.

11. The breathable material for protection against electromagnetic radiation of claim 1, wherein:
    a) said inorganic filler comprises gel, particulate material, powder, liquid, or a combination thereof.

12. The breathable material for protection against electromagnetic radiation of claim 1, further comprising:
    a) a breathability enhancing agent comprising a hydrophilic inorganic material.

13. The breathable material for protection against electromagnetic radiation of claim 12, wherein:
    a) the hydrophilic inorganic compound comprises magnesium hydroxide.

14. The breathable material for protection against electromagnetic radiation of claim 1, wherein:
    a) the pores have an average diameter of about 10 nm to about 5 micron.

15. The breathable material for protection against electromagnetic radiation of claim 1, wherein:
    a) said inorganic filler further comprises at least one inorganic agent selected from the group consisting of lead oxide, iron oxide, chrome oxide, titania, alumina, titanium oxide, zinc oxide, magnesium oxide, magnesium hydroxide, silver, silver compound, calcium oxide, calcium hydroxide, aluminum oxide, tin, tin compound, antimony, antimony compound, tungsten, tungsten compound, boron, boron compound, silicon, silicon compound, lead, lead compound, platinum, platinum compound, gold, gold compound, copper, copper compound, uranium, uranium compound, and a combination thereof.

* * * * *